Aug. 27, 1963  S. R. MAKOVIC  3,101,576
GRINDING AND POLISHING GLASS PLATES
Filed Aug. 9, 1962
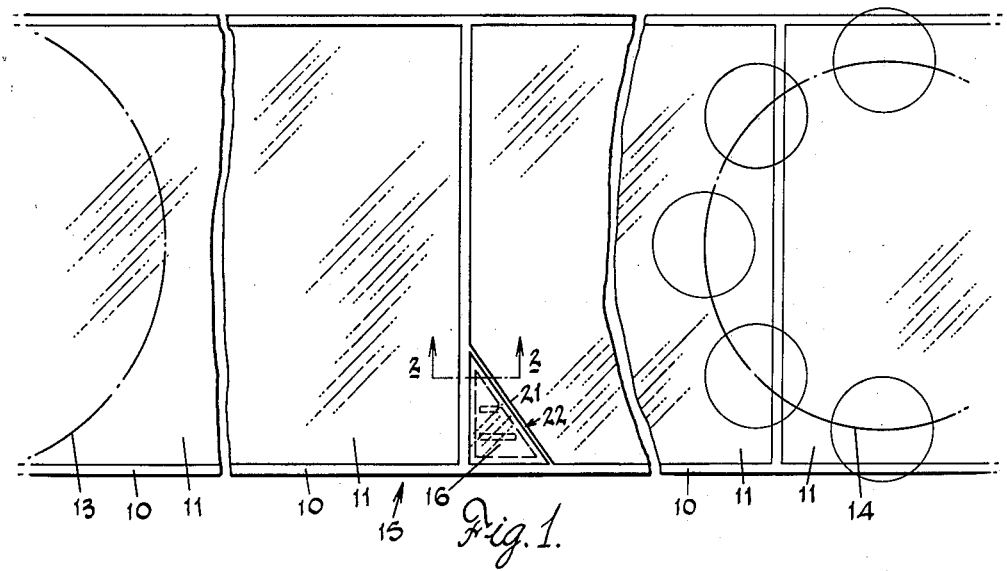
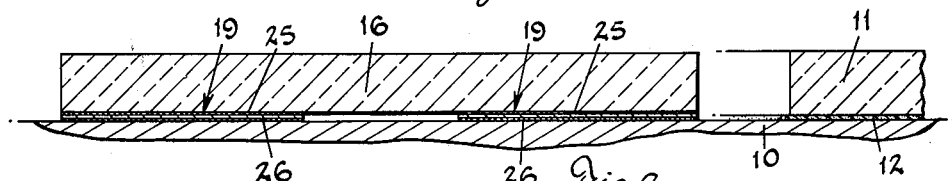
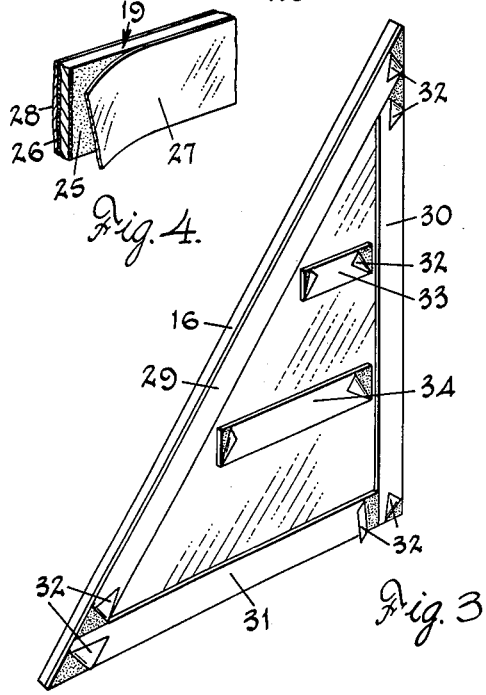
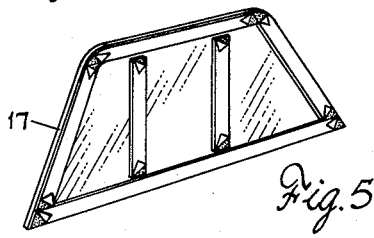
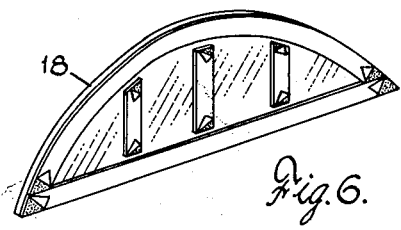
INVENTOR.
Stephen R. Makovic
BY
Nobbe & Swope
ATTORNEYS United States Patent Office 3,101,576
Patented Aug. 27, 1963

3,101,576
GRINDING AND POLISHING GLASS PLATES
Stephen R. Makovic, Rossford, Ohio, assignor to Libbey-Owens-Ford Glass Company, Toledo, Ohio, a corporation of Ohio
Filed Aug. 9, 1962, Ser. No. 215,885
4 Claims. (Cl. 51—283)

The present invention relates to the art of continuously grinding and polishing glass plates in the manufacture of plate glass.

In the continuous grinding and polishing of glass plates, according to one process, the large plates of glass to be surfaced are supported upon the upper solid surfaces of work tables and carried in a definite horizontal path, first beneath a series of grinding runners and then beneath a series of polishing runners. The grinding runners are usually of cast iron while the polishing runners are of felt. The glass plates are secured to the work tables by a layer of plaster. The plaster is first deposited as a slurry upon the tables after which the glass plates are laid on the layer of plaster and then embedded in the plaster by a rolling pressure. Upon setting of the plaster the glass plates become firmly embedded therein.

In such a process, glass plates sometimes become cracked or broken during passage thereof beneath the grinding runners. This may be caused by a defect in the glass plate or in the plaster, or in the manner in which the metal grinding runners operate on the glass. When this occurs the broken piece of glass are removed and the resulting open area or areas, depending on their size, filled with wet plaster or with one or more pieces of glass roughly approximating the broken out area which are laid in the wet plaster. This so-called "repair" of the broken plates is effected as the glass plates travel from the grinding runners to the polishing runners. However, such a procedure has not proven entirely satisfactory for the reasons that the plaster may not have sufficient time to set up or harden before the plaster and/or pieces of glass contact the felt polishing runners. This necessitates the raising and then lowering of successive polishing runners until the plaster has set. If this were not done, the partially set plaster would allow the replacement pieces of glass to be shifted upon being engaged by the polishing runners, thereby resulting in breaking or chipping of the edges of adjoining plates of glass. Should these glass chips become embedded in the polishing felts scratching or marring of the glass surfaces is very apt to occur. Likewise, the felt runners engaging the wet, although partially hardened, plaster become contaminated thereby which adversely affects the polishing action thereof on succeeding glass plates.

It is, therefore, a primary aim of this invention to provide an improved method of repairing the areas on the work tables which result from the removal of broken pieces of glass in a manner to obviate the disadvantages incident to the use of prior methods.

Another object of the invention is to provide such a method in which pre-cut glass replacement sheets are used to fill in the areas on the work tables resulting from the removal of broken pieces of glass and in which the replacement sheets are adhesively secured directly to the upper surfaces of the work tables.

Another object of the invention is to provide such a method in which the glass replacement sheets have been previously provided with a pressure sensitive adhesive tape by which they can be readily and quickly secured to the tables and subsequently removed therefrom.

Other objects and advantages of the invention will become more apparent during the course of the following description when taken in connection with the accompanying drawings.

In the drawings, wherein like numerals are employed to designate like parts throughout the same:

FIG. 1 is a fragmentary plan view of a continuous grinding and polishing system in which the method of this invention can be employed;

FIG. 2 is a transverse, vertical sectional view taken on line 2—2 of FIG. 1;

FIG. 3 is a perspective view of one of the glass replacement sheets employed in practicing the invention;

FIG. 4 is a fragmentary perspective view of a double coated adhesive tape for securing the glass replacement sheet in place; and FIGS. 5 and 6 are perspective views of other forms of glass replacement sheets.

With reference particularly to the drawings, there is illustrated diagrammatically in FIG. 1 a portion of a continuous grinding and polishing system including a plurality of work tables 10 which are arranged in end-to-end abutting relation and upon the upper surfaces of which large glass plates 11 to be ground and polished are secured. The glass plates are ordinarily secured to the work tables by embedding them in a layer of plaster 12.

The glass plates 11 are carried by the work tables 10 first beneath a series of metal grinding runners 13 and then beneath a series of felt polishing runners 14. Between the grinding and polishing runners is a so-called "middle yard" 15. As the glass plates travel beneath the metal grinding runners breakage of a glass plate sometimes occurs and when the broken or cracked glass plate reaches the "middle yard" 15, and before passing beneath the polishers, the broken piece or pieces of glass are removed by cutting them from the plate. Heretofore, the space or spaces left by the removal of the broken glass was filled with wet plaster or with one or more pieces of glass laid in the wet plaster. The disadvantages of such a procedure have been pointed out above.

According to the method of this invention, when breakage of a glass plate occurs during grinding, an operator cuts the broken glass from the plate to provide an area in which a previously prepared glass replacement sheet can be fitted. For this purpose, the operator has available for use a series of glass replacement sheets pre-cut to varying shapes and sizes such as shown in FIGS. 3, 5 and 6. Of these typical shapes, which are herein shown by way of example, the sheet 16 of FIG. 3 is generally triangular in outline and intended for use as a replacement piece in a corner area of a glass plate as shown in FIG. 1. The trapezoidal sheet 17 in FIG. 5 and the substantially circular segment 18 in FIG. 6, are illustrative of other shapes of glass replacement sheets that may be used to fill a cut-out area in the glass plate inwardly of the corners of the plate or in any of the marginal edges thereof.

Each of the glass replacement sheets is prepared in advance so as to be available to the operator for rapid and convenient attachment to the surface of the work table and, for this purpose, is provided upon one surface thereof with a suitable adhesive. The adhesive is preferably in the form of a pressure sensitive adhesive tape 19.

Upon reference to FIG. 1 it will be noted that a corner of one of the glass plates 11 has been removed by cutting the plate diagonally along the line 21 to provide a triangular cut-out area 22 in which one of the glass replacement sheets 16 shown in FIG. 4 is fitted. The outline of the cut-out area 22 is approximately the same as the outline of the replacement sheet 16 while the size of the cut-out area is slightly larger than the replacement sheet used. This reduces the amount of time required to make the repair since the work tables are continuously moving through the so-called "middle yard" 15 to the polishing runners 14.

The glass replacement sheets are prepared in advance by being cut to the desired shape and size and a strip of pressure sensitive adhesive tape 19 adhered to the marginal edges of one surface thereof. Preferably a double coated vinyl tape about .015" thick is used. As shown in FIG. 4 the tape is provided on its opposite surfaces with layers of adhesive 25 and 26 covered by non-adhesive protective layers 27 and 28, respectively.

When preparing the glass replacement sheet 16 of FIG. 3, the tape 19 is cut into suitable lengths 29, 30 and 31 from which one protective layer is then removed and the exposed adhesive layer firmly attached to the surface of the sheet along the marginal edges thereof; the protective layer being left on the outwardly directed adhesive layer of each length of the adhesive tape. The ends of the protective layers on the strip lengths are lifted from the respective adhesive layers to provide tabs 32 for convenient and rapid removal of the protective layers when it is desired to use the replacement sheet.

In repairing a broken glass plate, the operator selects a replacement sheet of suitable size and shape and cuts the broken glass from the glass plate to provide an area 22 of complementary size and shape to receive the selected replacement sheet. After removal of the plaster from the open area of the work table, the protective layers are removed from the outwardly directed adhesive layers of the tape by use of the tabs 32 and the replacement sheet is then inserted in the cut-out area with the exposed adhesive layer in contact with the surface of the table. Downward pressure by the operator will result in the sheet being firmly affixed directly to the surface of the work table. It will be appreciated that by the use of the pressure sensitive adhesive tape herein provided the replacement sheets can be easily and quickly adhered to the tables. After the polishing operation, the replacement sheets are relatively easily removed from the surface of the work tables by peeling or lifting them therefrom with suitable tools.

The glass replacement sheets are usually slightly thinner than the glass plates after grinding, but prior to polishing, so that the thickness of the replacement sheet plus the thickness of the adhesive tape will bring the upper surface of said replacement sheet substantially in the same plane as the surface of the glass plates during polishing. In other words, as shown in FIG. 2, the thickness of the replacement sheet compensates for the difference between the thickness of the adhesive tape 19 and the plaster layer 12.

To provide additional support for the replacement sheets against the pressure of the polishing runners, additional lengths 33 and 34 of adhesive tape may be affixed to the surface of the sheet inwardly of the edge strips. The replacement sheets 17 and 18 shown in FIGS. 5 and 6 are prepared in the same way as described above.

I claim:

1. In the grinding and polishing of glass plates in which the plates are embedded in a layer of plaster on the upper surfaces of work tables and passed first beneath a series of grinding runners and then beneath a series of polishing runners, the method which comprises cutting from a glass plate, after grinding but before polishing, cracked or broken glass, removing the plaster from the area resulting from the removal of the cracked or broken glass, inserting in said area a glass replacement sheet of a shape and size conforming substantially to the said area, and adhesively securing the replacement sheet directly to the surface of the work table.

2. In the grinding and polishing of glass plates in which the plates are embedded in a layer of plaster on the upper surfaces of work tables and passed first beneath a series of grinding runners and then beneath a series of polishing runners, the method which comprises cutting from a glass plate, after grinding but before polishing, cracked or broken glass, removing the plaster from the area resulting from the removal of the cracked or broken glass, providing a glass replacement sheet conforming substantially in shape and size to the cut-out area, applying an adhesive material to one surface of the replacement sheet, and securing the sheet by said adhesive directly to the upper surface of the work table.

3. In the grinding and polishing of glass plates, the method defined in claim 2, in which the adhesive material comprises a double coated adhesive tape having one surface secured to the replacement sheet and the other surface secured to the upper surface of the work table.

4. In the grinding and polishing of glass plates in which the plates are embedded in a layer of plaster on the upper surfaces of work tables and passed first beneath a series of grinding runners and then beneath a series of polishing runners, the method of repairing broken plates which comprises cutting the cracked or broken glass from the glass plate, removing the plaster from the area resulting from the removal of the cracked or broken glass, providing a glass replacement sheet conforming substantially in shape and size to the cut-out area, adhering to a surface of the replacement sheet an adhesive tape having on its outer surface an adhesive layer covered by a protective coating, removing the protective coating and inserting the replacement sheet in the cut-out area of the glass plate with the exposed adhesive layer in contact with the upper surface of the work table, and applying pressure to the replacement sheet to secure it to said table.

References Cited in the file of this patent

UNITED STATES PATENTS 1,589,787    Butler _____ June 22, 1926